Patented Oct. 24, 1922.

1,433,093

UNITED STATES PATENT OFFICE.

IWAN OSTROMISLENSKY, OF RIGA, RUSSIA, ASSIGNOR, BY MESNE ASSIGNMENTS, TO NEW YORK BELTING AND PACKING COMPANY, A CORPORATION OF NEW YORK.

PROCESS FOR VULCANIZING RUBBER AND PRODUCTS OBTAINED THEREBY.

No Drawing. Original application filed November 24, 1916, Serial No. 133,135. Divided and this application filed October 8, 1917. Serial No. 195,486.

*To all whom it may concern:*

Be it known that I, IWAN OSTROMISLEN-SKY, a citizen of Russia, residing at Riga, Latvia, have invented certain new and useful Improvements in Processes for Vulcanizing Rubber and Products Obtained Thereby, of which the following is a full, clear, and exact description.

This invention relates to processes for vulcanizing rubber or similar material, such as gutta-percha, balata, synthetic rubber, and materials commonly classed under the term "rubber," and to the products obtained thereby. It is more particularly directed to a process for the production of hard and soft rubber products in which the use of sulphur compounds as vulcanizing ingredients may be eliminated; and to the products resulting therefrom.

The vulcanization of rubber, according to the practice heretofore followed for the production of both hard and soft compounds, is performed by the use of sulphur or a sulphur-containing material. The commercial importance of other processes than those employing sulphur is practically negligible. The use of sulphur alone according to present processes is, however, open to objections which it is the object of the present invention to overcome. For example the cost of sulphur, although not large, is not negligible and its replacement by a cheaper vulcanizing agent, in view of the large quantity of rubber goods undergoing vulcanization, would effect a considerable saving. Furthermore, soft articles vulcanized by sulphur age somewhat rapidly. Further unavoidable excess of sulphur sometimes occurs in such articles to the detriment thereof—for example, the color of the article is affected and the life shortened. The range of colors obtainable in both hard and soft rubbers vulcanized by sulphur is limited, the majority of organic dyes, under the conditions heretofore pertaining, tending to change color.

The principal object of the present invention accordingly is to provide a simple and efficient process which by obviating the use of sulphur or sulphur compounds partially or entirely as the vulcanizing agent shall do away with various disadvantages noted in the use thereof. Another object is to provide a series of products having a wide range of desirable physical characteristics employing a vulcanizing agent or agents eliminating sulphur or sulphur compounds.

This is a division of my application Serial No. 133,135, filed November 24, 1916, which in turn is a division of my application Serial No. 112,187, filed July 29th, 1916.

Generally speaking, my invention consists in treating a mass of natural rubber or similar materials, such as gutta-percha, balata, synthetic rubber, and materials commonly classed under the term "rubber" with an oxygen compound of rubber or with an oxygen compound of the similar materials referred to.

As one embodiment of my invention, this oxygen compound may be prepared as an ozonide of rubber by subjecting layers of rubbers from 0.5 to 1 mm. in thickness to the action of a stream of dried air under the influence of rays of a mercury lamp. After an increase in weight of the original rubber from 0.2 to 1% is secured the product is milled on cold rollers and then reheated for 1–15 minutes at 100 to 120° C. If a small quantity of the ozonides are mixed with unvulcanized rubber and subjected to heat in the usual manner in a vulcanizing press, vulcanization is satisfactorily accomplished. According to the quantity of the ozonides of rubber added to the natural rubber, either soft or hard rubber may be produced.

It will be observed that the process mentioned is applicable not only to natural rubber, but may be applied to various synthetic rubbers. For example, tests carried out with dimethylerythrene and normal erythrene produced good results.

Many apparently widely different embodiments of the invention could be made without departing from the spirit thereof. The oxygen compound need not be limited to an ozonide of rubber or an ozonide of similar materials nor is the ozonide restricted to its preparation by the process here referred to. For example, the ozonide of rubber or of similar materials may be formed by subjecting the material to a stream of dry air in which ozone has been introduced by any known ozone generating apparatus. It is therefore to be understood that I do not limit myself to the specific form of the invention set forth except as indicated in the appended claims.

Having thus described my invention, what I claim and desire to protect by Letters Patent is:

1. A process for treating rubber or similar material which comprises adding thereto a rubber compound containing oxygen and inducing vulcanization to take place under the action thereof.

2. A process for treating rubber or similar material which comprises forming an oxygen compound of rubber adapted to produce vulcanization, adding said compound to unvulcanized rubber and inducing vulcanization to take place thereby.

3. A process for treating rubber-like vulcanizable material which comprises adding thereto a compound of such material containing oxygen and inducing vulcanization to take place under the action thereof.

4. A process for treating rubber-like vulcanizable material which comprises forming an ozonide of such material adapted to produce vulcanization, adding said compound to said material, and inducing vulcanization to take place thereby.

5. A process for treating rubber or similar material which comprises adding thereto an ozonide of rubber and inducing vulcanization to take place under the action thereof.

6. A process for treating rubber which comprises adding thereto an ozonide of rubber-like material and inducing vulcanization to take place under the action thereof.

7. A process for treating rubber-like vulcanizable material which comprises adding thereto an ozonide of such material and inducing vulcanization to take place under the action thereof.

8. A process for treating rubber or similar material which comprises forming an ozonide of rubber adapted to produce vulcanization, adding said compound to unvulcanized rubber and inducing vulcanization to take place thereby.

9. A process for treating rubber or similar material which comprises forming an ozonide of the rubber or of similar material adapted to produce vulcanization, adding said compound to the unvulcanized rubber or similar material, and inducing vulcanization to take place thereby.

10. A process for treating rubber-like vulcanizable material which comprises forming an ozonide of such material adapted to produce vulcanization, adding said compound to said material, and inducing vulcanization to take place thereby.

11. A process for treating rubber or similar material which comprises forming an ozonide of rubber by subjecting layers of rubber to the action of a stream of dried air under the influence of rays from a mercury lamp, adding said compound to the rubber or similar material to be treated, and inducing vulcanization to take place thereby.

12. A process for treating rubber or similar material which comprises forming an ozonide of rubber or of similar material by subjecting the rubber or similar material to the action of a stream of dry air in which ozone has been introduced, adding said ozonide to the rubber or similar material to be treated, and inducing vulcanization to take place thereby.

13. A process for treating rubber or similar material which comprises forming an ozonide of rubber by subjecting layers of rubber to the action of a stream of dried air under the influence of rays from a mercury lamp, mixing the ozonide thus formed with the rubber or similar material to be treated, and subjecting the mixture to the vulcanizing temperature.

14. As a new compound, a vulcanized rubber comprising products of the action of a vulcanizing agent consisting of a rubber compound containing oxygen.

15. As a new compound, a vulcanized rubber comprising the products of the action of a vulcanizing agent comprising an ozonide of rubber.

16. As a new compound, rubber vulcanized by an oxygen compound of rubber.

17. As a new compound, rubber vulcanized by an ozonide of rubber.

18. As a new compound, a vulcanized rubber-like material comprising products of the action of a compound of the material containing oxygen.

19. As a new compound, a vulcanized rubber-like material comprising products of the action of an ozonide of such material.

20. As a new compound, a rubber-like material, vulcanized by an oxygen compound of that material.

21. As a new compound, a rubber-like material vulcanized by an ozonide of that material.

22. As a new compound, soft rubber vulcanized by an oxygen compound of rubber.

23. As a new compound, soft rubber vulcanized by an ozonide of rubber.

Signed at Riga this 7th day of December, 1921.

Prof. IWAN OSTROMISLENSKY.